US012763867B2

(12) United States Patent
Choubar et al.

(10) Patent No.: US 12,763,867 B2
(45) Date of Patent: Oct. 13, 2026

(54) DEVICES AND METHODS FOR STEERING AN ELECTROMAGNETIC BEAM HAVING ONE OR MORE ORBITAL ANGULAR MOMENTUM MODES

(71) Applicant: HUAWEI TECHNOLOGIES CO., LTD., Shenzhen (CN)

(72) Inventors: Mohammad Akbari Choubar, Ottawa (CA); Tan Huy Ho, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 19/090,709

(22) Filed: Mar. 26, 2025

(65) Prior Publication Data

US 2025/0226909 A1 Jul. 10, 2025

Related U.S. Application Data

(63) Continuation of application No. PCT/CN2022/122878, filed on Sep. 29, 2022.

(51) Int. Cl.
*H04J 14/00* (2006.01)
*H01Q 3/34* (2006.01)
(Continued)

(52) U.S. Cl.
CPC ............... *H04J 14/07* (2023.08); *H01Q 3/34* (2013.01); *H01Q 21/064* (2013.01); *H04B 7/043* (2013.01)

(58) Field of Classification Search
CPC ......... H04J 14/07; H01Q 3/34; H01Q 21/064; H04B 7/043
See application file for complete search history.

(56) References Cited

U.S. PATENT DOCUMENTS 10,516,486 B2 * 12/2019 Ashrafi ................ H04B 10/516
10,790,586 B2 * 9/2020 Klemes .................... H01Q 3/36
(Continued)

FOREIGN PATENT DOCUMENTS

CN 106450738 A 2/2017
CN 110336123 A 10/2019
(Continued)

OTHER PUBLICATIONS

China National Intellectual Property Administration, International Search Report issued for Application No. PCT/CN2022/122878, China, Apr. 23, 2023.
(Continued)

*Primary Examiner* — Freshteh N Aghdam
(74) *Attorney, Agent, or Firm* — Tim Tingkang Xia, Esq.; Troutman Pepper Locke LLP

(57) ABSTRACT

An apparatus for steering a beam includes a beamforming device for receiving electromagnetic (EM) waves and outputting, based on the received EM waves, EM waves having one or more orbital angular momentum (OAM) modes. The apparatus further includes phase shifters for modulating, based on one or more steering patterns, the EM waves outputted by the beamforming device. The apparatus further includes a radial waveguide divided into multiple waveguide sectors. Each waveguide sector has an input connected to one of the phase shifters, and one or more slot line antennas for transmitting the EM waves modulated by the phase shifter connected to the input, wherein the one or more slot line antennas are oriented differently to the one or more slot line antennas of each other waveguide sector.

19 Claims, 14 Drawing Sheets

(51) Int. Cl.
*H01Q 21/06* (2006.01)
*H04B 7/0426* (2017.01)

(56) References Cited

U.S. PATENT DOCUMENTS

| | | | | |
|---|---|---|---|---|
| 11,088,752 | B1 * | 8/2021 | Klemes | H04L 27/2639 |
| 2008/0060760 | A1 | 3/2008 | Chen | |
| 2015/0029070 | A1 * | 1/2015 | Ohshima | H01Q 15/22 343/912 |
| 2015/0188660 | A1 | 7/2015 | Byun et al. | |
| 2018/0039154 | A1 | 2/2018 | Hashemi et al. | |
| 2018/0287262 | A1 * | 10/2018 | Patri | H01Q 13/02 |
| 2025/0226594 | A1 * | 7/2025 | Zhang | H01Q 21/24 |

FOREIGN PATENT DOCUMENTS

| | | | |
|---|---|---|---|
| JP | 2007209017 | A | 8/2007 |
| JP | 2012023600 | A | 2/2012 |
| WO | 2013/098795 | A1 | 7/2013 |

OTHER PUBLICATIONS

M. Akbari et al., "Highly Efficient Front End Direct Conversion Receiver for 28-GHz Wireless Access Point," IEEE Access, vol. 9, pp. 88879-88893, 2021.

M. Akbari, A. Farahbakhsh and A. Sebak, "Ridge Gap Waveguide Multilevel Sequential Feeding Network for High-Gain Circularly Polarized Array Antenna," IEEE Transactions on Antennas and Propagation, vol. 67, No. 1, pp. 251-259, Jan. 2019.

M. Akbari et al., "Highly Efficient 30 GHz 2x2 Beamformer Based on Rectangular Air-Filled Coaxial Line," IEEE Transactions on Antennas and Propagation, vol. 68, No. 7, pp. 5236-5246, Jul. 2020.

G. Xie et al., "Tunable generation and angular steering of a millimeter-wave orbital-angular-momentum beam using differential time delays in a circular antenna array," 2016 IEEE International Conference on Communications (ICC), 2016, pp. 1-6, doi: 10.1109/ICC.2016.7511072.

M. H. Hassan, M. Al-Mulla, B. Sievert, A. Rennings and D. Erni, "Evaluation of Different Phased Array Approaches for Orbital Angular Momentum Beam Steering," 2020 German Microwave Conference (GeMiC), 2020, pp. 44-47.

Shabanpour, J., Beyraghi, S. & Cheldavi, A. Ultrafast reprogrammable multifunctional vanadium-dioxide-assisted metasurface for dynamic THz wavefront engineering. Sci Rep 10, 8950 (2020).

P. Feng, S. Qu and S. Yang, "OAM-Generating Transmitarray Antenna With Circular Phased Array Antenna Feed," in IEEE Transactions on Antennas and Propagation, vol. 68, No. 6, pp. 4540-4548, Jun. 2020.

Lee, D., Sasaki, H., Fukumoto, H., Yagi, Y., & Shimizu, T. (2019). An evaluation of orbital angular momentum multiplexing technology. applied sciences, 9(9), 1729.

P. Schemmel, G. Pisano, and B. Maffei, "Modular spiral phase plate design for orbital angular momentum generation at millimetre wavelengths," Opt. Express, vol. 22, No. 12, pp. 14 712-14 726, 2014.

X. Xu, A. Mazzinghi, A. Freni and J. Hirokawa, "Simultaneous Generation of Three OAM Modes by Using a RLSA Fed by a Waveguide Circuit for 60 GHz-band Radiative Near-field Region OAM Multiplexing," IEEE Transactions on Antennas and Propagation, vol. 69, No. 3, pp. 1249-1259, Mar. 2021.

A. Mazzinghi and A. Freni, "Simultaneous Generation of Pseudo-Bessel Vortex Modes With a RLSA," IEEE Antennas and Wireless Propagation Letters, vol. 16, pp. 1747-1750, 2017.

Xie, Guodong, Zhe Zhao, Yan Yan, Long Li, Yongxiong Ren, Nisar Ahmed, Yinwen Cao et al. "Demonstration of tunable steering and multiplexing of two 28 GHz data carrying orbital angular momentum beams using antenna array." Scientific reports 6, No. 1 (2016): 1-9.

M. Klemes, H. Boutayeb and F. Hyjazie, "Orbital angular momentum (OAM) modes for 2-D beam-steering of circular arrays," 2016 IEEE Canadian Conference on Electrical and Computer Engineering (CCECE), 2016, pp. 1-5.

F. Qin, R. Song, W. Cheng and H. Zhang, "Multibeam OAM Transmitarray With Stable Vortex Property Based on Bifocal Method," in IEEE Antennas and Wireless Propagation Letters, vol. 20, No. 9, pp. 1601-1605, Sep. 2021.

S. Yu, N. Kou, J. Jiang, Z. Ding and Z. Zhang, "Beam Steering of Orbital Angular Momentum Vortex Waves with Spherical Conformal Array," in IEEE Antennas and Wireless Propagation Letters, vol. 20, No. 7, pp. 1244-1248, Jul. 2021.

Purnamirza, Teddy. "Radial line slot array (RLSA) antennas." Telecommunication Systems—Principles and Applications of Wireless-Optical Technologies. IntechOpen, 2019.

Kelly KC. Recent annular slot array experiments. In: IRE National Convention Record; vol. 5; 1957;1. pp. 144-151

* cited by examiner

DEVICES AND METHODS FOR STEERING AN ELECTROMAGNETIC BEAM HAVING ONE OR MORE ORBITAL ANGULAR MOMENTUM MODES

CROSS-REFERENCE TO RELATED APPLICATION

This application is a continuation of PCT Application No. PCT/CN2022/122878, entitled "DEVICES AND METHODS FOR STEERING AN ELECTROMAGNETIC BEAM HAVING ONE OR MORE ORBITAL ANGULAR MOMENTUM MODES," filed on Sep. 29, 2022, and which is hereby incorporated herein by reference in its entirety.

TECHNICAL FIELD

The present disclosure relates to the field of wireless communications, and in particular to devices and methods for steering an electromagnetic beam having one or more orbital angular momentum modes.

BACKGROUND

Continued growth in the number of mobile device users and the need for adequate bandwidth capacity in free-space line-of-sight communication links, as well as higher data transfer rates, has increased the importance of multimedia services and mobile Internet in wireless communication systems.

One method that attempts to address this need is through the transmission of multiple, orthogonal, data-carrying beams from a single transceiver aperture pair. According to this method, every beam occupies an individual spatial mode in an orthogonal basis set. Using multiple orbital angular momentum (OAM) modes, such mode-division-multiplexing (MDM) can be demonstrated in free-space line-of-sight communication links. An OAM beam comprises a phase front of exp ($jk\theta$) which "twists" in a helical form as it propagates. k is the OAM order ($k=0, \pm1, \pm2, \ldots$) and $\theta$ is the azimuthal angle.

Precise alignment between the transmitter and receiver in communication systems plays an important role to ensure that adequate signal power is received at the receiver. For OAM multiplexing systems, precise alignment is of even greater importance since misalignment might lead to cross-talk among channels. Accordingly, a transmitter should be able to both generate OAM beams and steer the beams for active pointing.

The few OAM beam-scanning systems that have been reported in the literature tend to be complex, costly, manual (non-electronic), and suffer from limited scan range and/or poor radiating performance (e.g. deteriorated side lobe level, insufficient directivity, high loss, poor quality of phase calibration, and/or low efficiency).

SUMMARY

According to a first aspect of the disclosure, there is provided an apparatus for steering a beam, comprising: a beamforming device for receiving electromagnetic (EM) waves and outputting, based on the received EM waves, EM waves having one or more orbital angular momentum (OAM) modes; phase shifters for modulating, based on one or more steering patterns, the EM waves outputted by the beamforming device; and a radial waveguide divided into multiple waveguide sectors, each waveguide sector comprising: an input connected to one of the phase shifters; and one or more slot line antennas for transmitting the EM waves modulated by the phase shifter connected to the input, wherein the one or more slot line antennas are oriented differently to the one or more slot line antennas of each other waveguide sector. Therefore, the EM waves may have a relatively large number of OAM mode orders, thereby increasing the capacity and spectral efficiency during wireless communications. Furthermore, the EM beam that is output from the radial waveguide may be steered.

The beamforming device may comprise a Butler matrix.

The apparatus may further comprise a controller operable to: set the one or more steering patterns; and control the phase shifters to modulate, based on the one or more steering patterns, the EM waves outputted by the beamforming device.

The controller may be further operable to: adjust the one or more steering patterns; and steer, based on the adjusted one or more steering patterns, a beam formed by the transmission of the EM waves by the one or more slot line antennas of each waveguide sector. According to some embodiments, the apparatus may be configured to electronically steer an EM beam through 360° in azimuth and almost 10° in elevation, while supporting a relatively high number of OAM modes.

The controller may be further operable to control the beamforming device so as to adjust the one or more OAM modes of the EM waves output by the beamforming device.

The radial waveguide may further comprise one or more absorbers separating each waveguide sector from each adjacent waveguide sector and configured to absorb EM waves incident on the one or more absorbers. Therefore, the radial waveguide may benefit from reduced leakage and a relatively high degree of isolation.

The slot line antennas of the radial waveguide may be configured to circularly polarize the EM waves modulated by the phase shifters.

The slot line antennas of the radial waveguide may be configured to linearly polarize the EM waves modulated by the phase shifters.

Each waveguide sector may comprise a cavity filled with air. Therefore, the radial waveguide may benefit from relatively lower losses.

The slot line antennas of the radial waveguide may be positioned so as to define a number of concentric circles. The simulation of EM beam generation using a radial waveguide with concentrically-arranged slot line antennas is easier and simpler than it is, for example, for spirally-arranged slot line antennas.

The radial waveguide may be a first radial waveguide, and the apparatus may further comprise: a second radial waveguide concentric with the first radial waveguide and divided into multiple waveguide sectors, each waveguide sector of the second radial waveguide comprising: an input connected to one of the phase shifters; and one or more slot line antennas for transmitting the EM waves modulated by the phase shifter connected to the input, wherein the one or more slot line antennas are oriented differently to the one or more slot line antennas of each other waveguide sector of the second radial waveguide, and wherein a radius of the second radial waveguide is less than a radius of the first radial waveguide. A multi-level radial waveguide, by comprising a relatively larger number of waveguide sectors, may benefit from increased transmission/reception bandwidth. Furthermore, the slot line antennas of the first or second radial waveguide may be configured to linearly or circularly polarize the EM waves modulated by the phase shifters.

According to a further aspect of the disclosure, there is provided a method of transmitting a beam, comprising: generating electromagnetic (EM) waves having one or more orbital angular momentum (OAM) modes; modulating, using phase shifters, and based on one or more steering patterns, the EM waves; and transmitting the modulated EM waves using a radial waveguide divided into multiple waveguide sectors, each waveguide sector comprising one or more slot line antennas oriented differently to the one or more slot line antennas of each other waveguide sector.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which.

DETAILED DESCRIPTION

Figure 1:
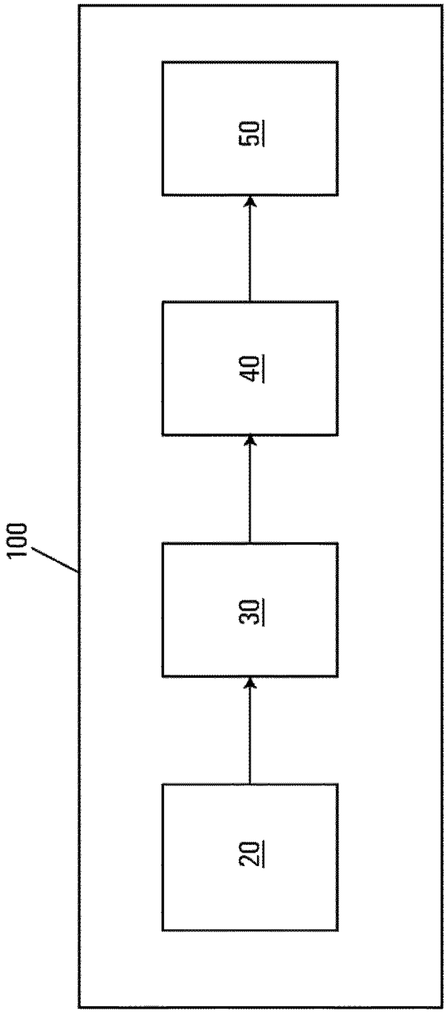
FIG. 1 is a schematic diagram of a device for steering an electromagnetic (EM) beam having one or more orbital angular momentum (OAM) modes (an "EM OAM beam"), according to an embodiment of the disclosure.

The present disclosure seeks to provide devices and methods for steering an EM OAM beam. While various embodiments of the disclosure are described below, the disclosure is not limited to these embodiments, and variations of these embodiments may well fall within the scope of the disclosure which is to be limited only by the appended claims.

Generally, according to embodiments of the disclosure, there is provided a device for steering an electromagnetic (EM) beam (a "beam steering device") having one or more orbital angular momentum (OAM) modes. The beam steering device comprises a beamforming device (such as an analogue Butler matrix) configured to receive, as an input, EM waves that have been generated from an external source (such as an EM signal generator). The beamforming device is configured to change the phase of the input EM waves to produce EM waves having one or more OAM modes (EM OAM waves). The beam steering device further includes phase shifters for modulating, based on one or more steering patterns, the EM OAM waves output by the beamforming device. The beam steering device further includes a radial waveguide divided into multiple waveguide sectors. Each waveguide sector includes an input (such as a coaxial probe) connected to one of the phase shifters, and one or more slot line antennas for transmitting the EM OAM waves modulated by the phase shifter connected to the input. Therefore, each waveguide sector includes a set of one or more slot line antennas having their own independent input phase. Furthermore, the one or more slot line antennas of a given waveguide sector are oriented differently to the one or more slot line antennas of each other waveguide sector.

Advantageously, the EM waves may have a relatively large number of OAM mode orders, thereby increasing the capacity and spectral efficiency during wireless communications. For example, using a radial waveguide with 16 individual waveguide sectors, EM waves with +/−7 OAM modes may be transmitted. In order to increase the number of available OAM modes, the number of waveguide sectors may be increased (for example, a radial waveguide with waveguide sectors may be used). Additionally, embodiments of the beam steering devices described herein may be configured to electronically steer an EM beam through 360° in azimuth and almost 10° in elevation, while supporting higher OAM modes. Furthermore, the beam steering devices described herein may benefit from reduced leakage and a high degree of isolation.

Further still, the radial waveguide may be filled with air (instead of another dielectric material) in order to provide a beam steering device that benefits from lower losses, the beam steering device may have a tailorable gain (with directivity greater than 20 dBi for the zeroth OAM mode). The gain may be tailored by adjusting the number of slot line antennas in each sector of the radial waveguide. The beam steering device may have increased robustness by being made fully out of metal (such as aluminium). The radial waveguide may also have a high directivity (greater than 20 dB), again by increasing the number of slot line antennas in each sector of the radial waveguide.

Turning to FIG. 1, there is shown a schematic diagram of a beam steering device 100 for steering an EM beam having one or more OAM modes, according to an embodiment of the disclosure. Beam steering device 100 comprises a controller 20, a beamforming device 30, a set of variable phase shifters 40, and a radial waveguide 50. Controller 20 may be, for example, any suitable kind of microcontroller with Field Programmable Gate Array (FPGA) circuitry or Application-Specific Integrated Circuit (ASIC) components.

According to some embodiments, beamforming device 30 may be a Butler matrix configured to receive, as an input, EM waves that have been generated from an external source (such as an EM signal generator; not shown). Beamforming device 30 is configured to change the phase of the input EM waves to produce EM waves having one or more OAM modes. However, other suitable devices (such as a Rotman Lens) operable to induce phase shifts may be used to modulate EM waves that are input to beamforming device 30 in order to output EM waves having one or more OAM modes.

Any of various suitable types of variable phase shifters 40 may be used. As described in further detail below, phase shifters 40 are used to induce a steering phase to the EM OAM waves that are input to phase shifters 40, thereby enabling the EM OAM beam output by radial waveguide 50 to be steered under the control of controller 20. Preferably, phase shifters 40 should benefit from good electrical performance and low insertion loss.

Generally, radial waveguide 50 comprises a circular radiating element on a top side thereof, a cavity, a background plate, and multiple inputs. The circular radiating element may be made of metal (e.g. aluminium). The radiating element includes a number of slots formed therein. The slots may be positioned so as to define a number of concentric circles. The simulation of EM beam generation using a radial waveguide with concentrically-arranged slot line antennas is easier and simpler than it is for spirally-arranged slot line antennas. Each slot behaves as a single antenna element, and the total number of slots therefore form an antenna array. The background plate may also be made of metal but lacks any slots formed therein. The cavity acts as a circular waveguide for causing the signal from the inputs to propagate in the radial direction.

Figure 2A:
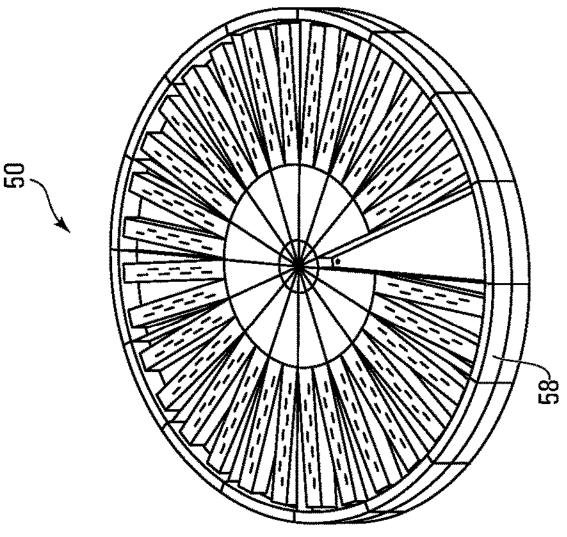
FIGS. 2A and 2B are, respectively, schematic diagrams of a radial waveguide and a waveguide sector of the radial waveguide, according to an embodiment of the disclosure.
Figure 2B:
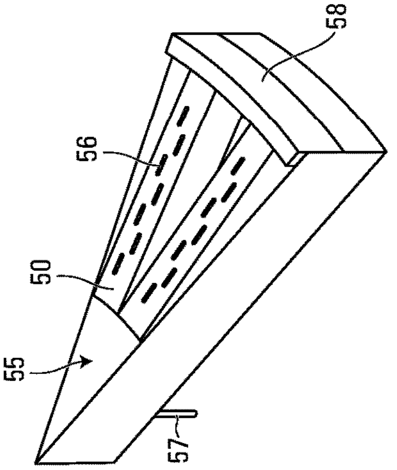

An example of radial waveguide 50 is shown in greater detail in FIG. 2A. As can be seen in FIG. 2A, radial waveguide 50 comprises a number of waveguide sectors 55 (with one waveguide sector removed for clarity and displayed in greater detail in FIG. 2B). Each waveguide sector 55 is isolated from each waveguide sector 55 by using metal and an EM-wave absorbing material. Any suitable EM-wave absorbing material may be used in order to increase isolation between adjacent waveguide sectors.

Each waveguide sector 55 includes slot line antennas 56 for transmitting EM OAM waves fed into the waveguide sector 55 via a respective coaxial probe 57. Each waveguide sector 55 may comprise any suitable number of slot line antennas 56. Each coaxial probe 57 is connected to one of phase shifters 40. Therefore, with N waveguide sectors 55, radial waveguide 50 includes a total of N coaxial probes 57, each coaxial probe 57 configured to feed its corresponding waveguide sector 55 with EM OAM waves transmitted along the coaxial probe 57. Radial waveguide 50 further includes an absorber 58 circumscribing a periphery of radial waveguide 50, for preventing possible leakages of the EM OAM beam transmitted by radial waveguide 50. Radial waveguide 50 is furthermore filled with air instead of another dielectric material.

The shape of coaxial probes 57 enables coaxial probes 57 to convert the EM OAM waves from a TEM coaxial mode into a TEM cavity mode. This enables the EM OAM waves to propagate in the radial direction upon entering the cavity of radial waveguide 50. A considerable part of the power of the EM OAM waves propagating in the radial direction is then captured by slot line antennas 56 for transmission therefrom. The slot line antennas 56 in a given waveguide sector 55 are oriented differently to the slot line antennas 56 in each other waveguide sector 55. This enables the EM OAM beam to be steered through the full 360° in the azimuth direction.

During operation of beam steering device 100, beamforming device 30, under the control of controller 20, outputs EM waves having one or more orbital angular momentum (OAM) modes. For example, controller 20 may activate ports of Butler matrix 30 to modulate EM waves input to Butler matrix 30 according to certain desired OAM modes. In addition, a steering pattern may be set by controller 20. For example, a user may program controller 20 to steer the EM OAM beam according to a particular azimuth and/or elevation angle. Based on the steering pattern, controller 20 controls variable phase shifters 40 so as to modulate the EM OAM waves according to the steering pattern. Therefore, controller 20 may control each individual phase shifter 40 to achieve the desired steering pattern of the EM OAM beam that will be transmitted by radial waveguide 50.

After modulation by phase shifters 40, each waveguide sector 55 of radial waveguide 50 is, via its respective coaxial probe 57, fed by the output of the phase shifter 40 associated with the waveguide sector 55. The EM OAM waves that are input to the waveguide sector 55 are then transmitted via the slot line antenna 56 of the waveguide sector 55.

Therefore, by adjusting the steering pattern set by controller 20, the EM OAM beam transmitted by radial waveguide 50 may be steered.

Figure 3A:
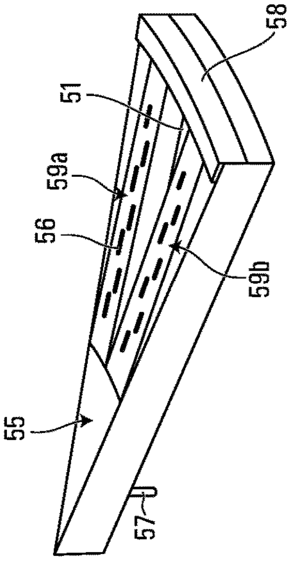
FIGS. 3A and 3B show different views of a waveguide sector, according to an embodiment of the disclosure.
Figure 3B:
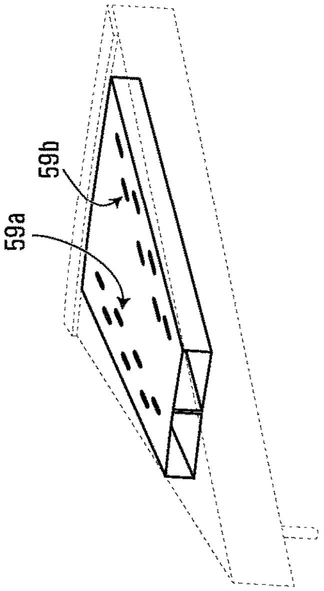

FIGS. 3A and 3B show, respectively, different views of a waveguide sector 55 of radial waveguide 50. In particular, FIG. 3A shows a modelled waveguide sector 55 including a gap 51 formed between a pair of groups 59*a* and 59*b* of slot line antennas 56. FIG. 3B shows waveguide sector 55 after fabrication, wherein gap 51 has been filled (e.g. with metal) for ease of manufacturing.

Figure 4:
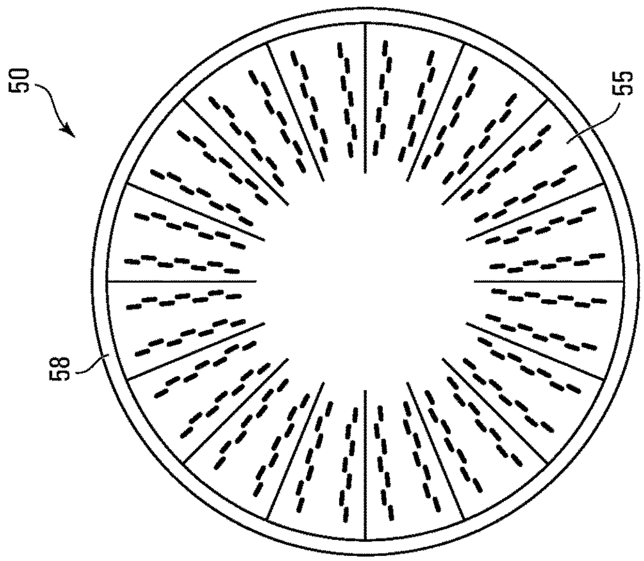
FIG. 4 shows a radial waveguide including an absorber, according to an embodiment of the disclosure.

FIG. 4 shows radial waveguide 50 including absorber 58.

Figure 5C:
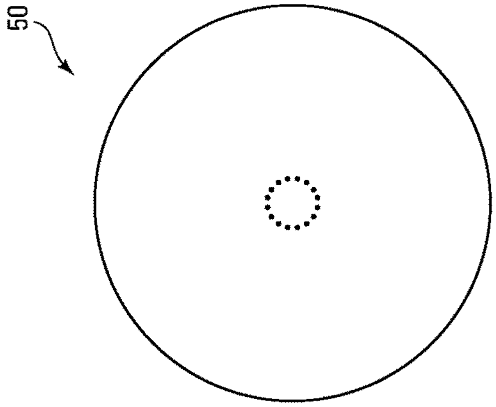
FIGS. 5A-5C show, respectively, a top side of a first layer of a radial waveguide, a back side of the first layer of the radial waveguide, and a top view of a second layer of the radial waveguide, according an embodiment of the disclosure.
Figure 5B:
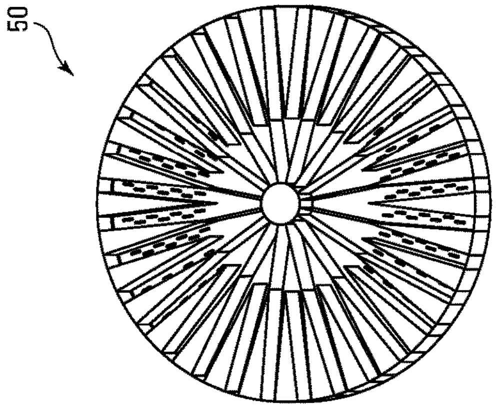
Figure 5A:
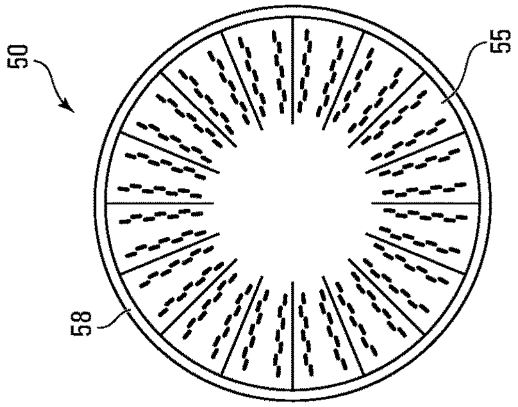

FIGS. 5A-5C show, respectively, a top side of a first layer of radial waveguide 50, a back side of the first layer of radial waveguide 50, and a top view of a second layer of the radial waveguide 50.

Figure 6:
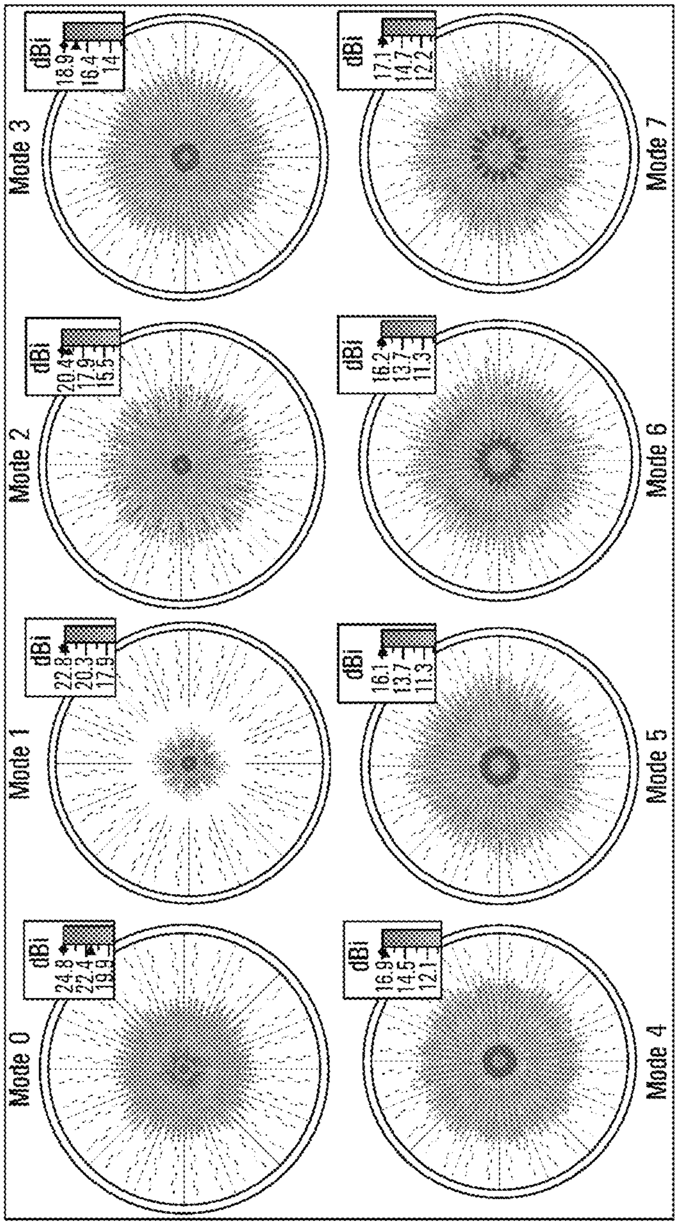
FIG. 6 shows simulated radiation patterns for different OAM modes generated using a beam steering device according to an embodiment of the disclosure.

FIG. 6 shows simulated radiation patterns for different OAM modes generated using beam steering device 100.

Figure 7:
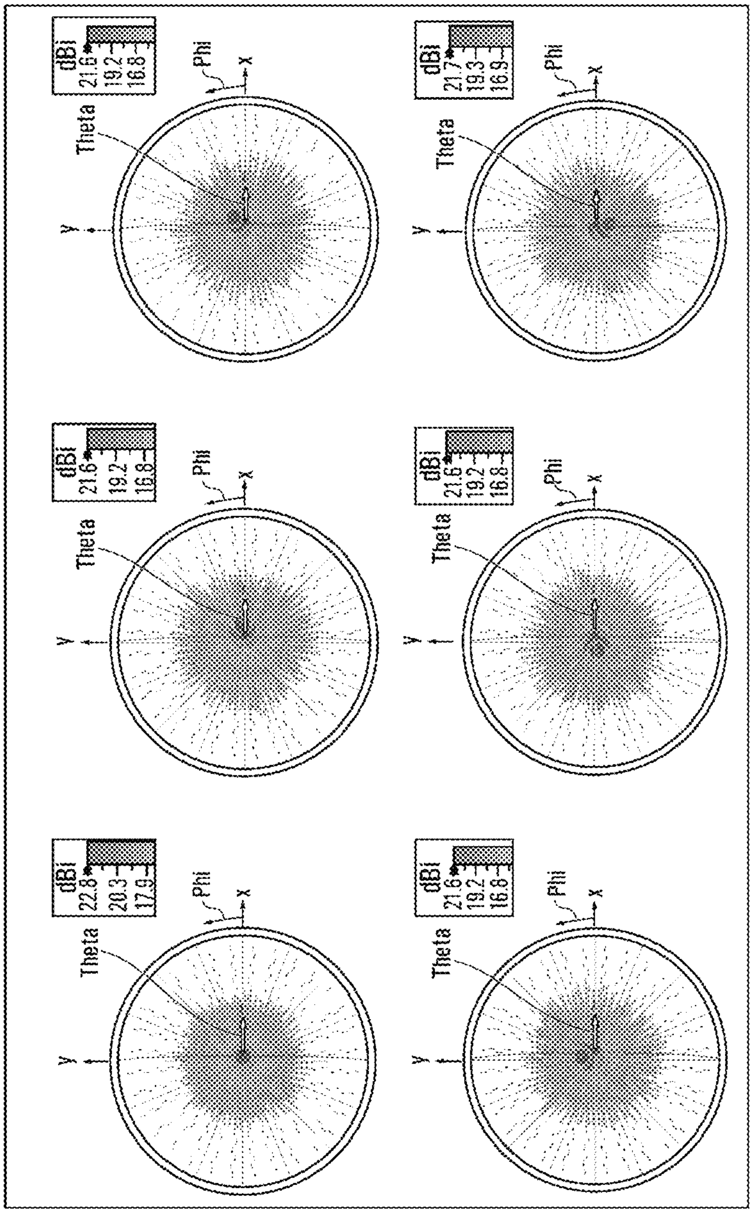
FIG. 7 shows simulated beam steering over the azimuth plane of an OAM radiation pattern generated using a beam steering device according to an embodiment of the disclosure.

FIG. 7 shows simulated beam steering over the azimuth plane of an OAM radiation pattern generated using beam steering device 100.

Turning to FIGS. 8A-8D, there is shown another example radial waveguide 60 according to another embodiment of the disclosure. According to this embodiment, radial waveguide 60 includes a first radial waveguide portion 62, and a second radial waveguide portion 64 mounted on top of and concentric to first radial waveguide portion 62. A radius of second radial waveguide portion 64 is less than a radius of first radial waveguide portion 62. Each of first radial waveguide portion 62 and second radial waveguide portion 64 is divided into multiple waveguide sectors 65, similarly to the embodiment described above in connection with FIGS. 2A and 2B.

Figure 8A:
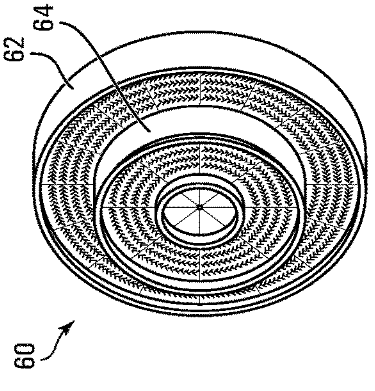
FIGS. 8A-8D show, respectively, perspective views of a dual-level radial waveguide, a top view of the dual-level radial waveguide, a waveguide sector of the dual-level radial waveguide, and RF coaxial probes of the dual-level radial waveguide, according to an embodiment of the disclosure.
Figure 8B:
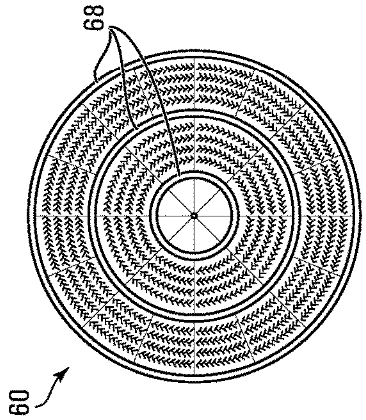
Figure 8C:
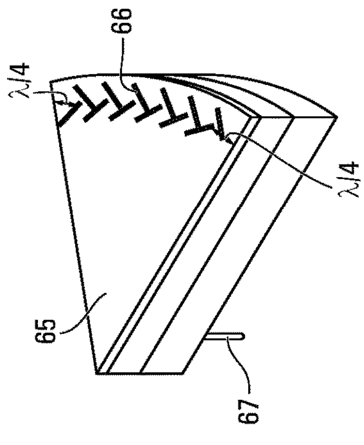
Figure 8D:
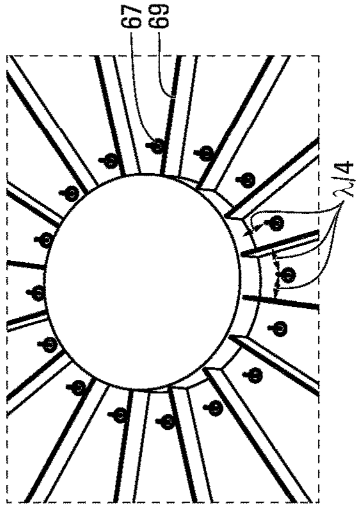
Figure 9A:
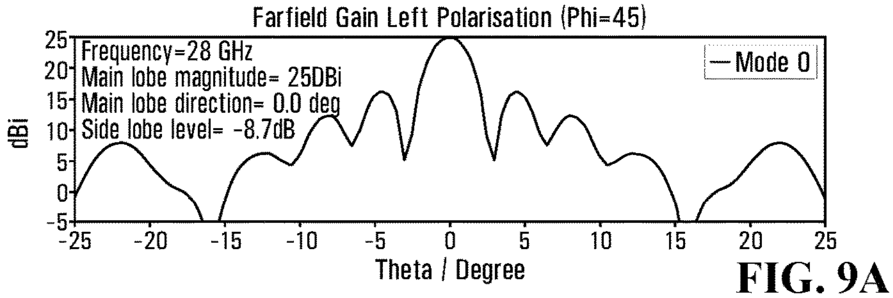
FIGS. 9A-9H show left-hand circular polarized gain radiation patterns under different OAM modes for a radial waveguide with sixteen waveguide sectors, according to an embodiment of the disclosure.
Figure 9B:
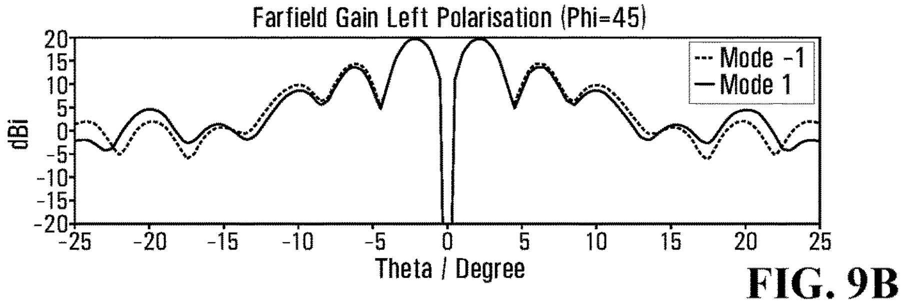
Figure 9C:
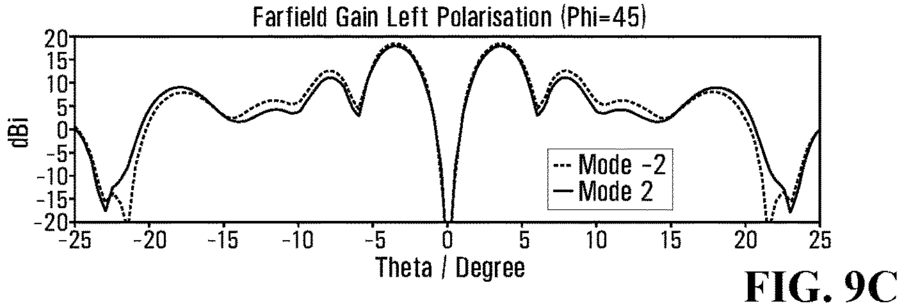
Figure 9D:
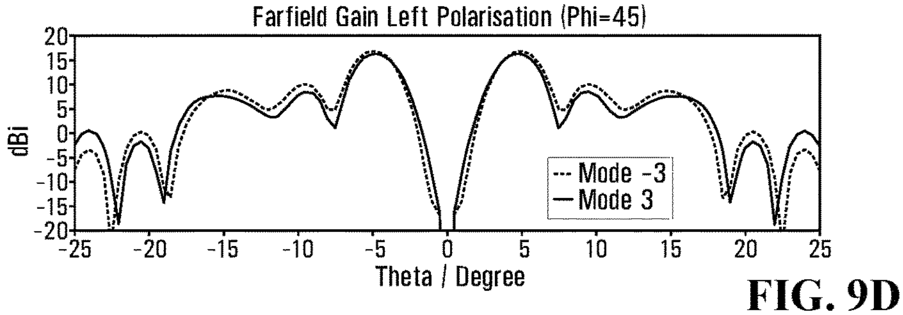
Figure 9E:
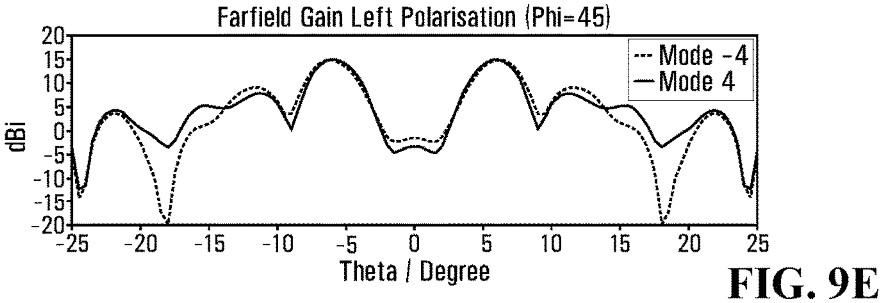
Figure 9F:
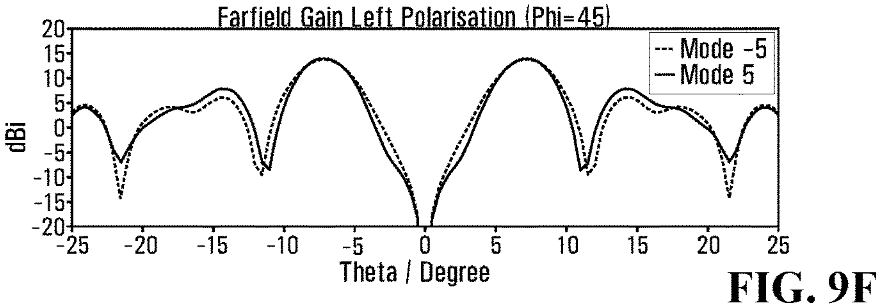
Figure 9G:
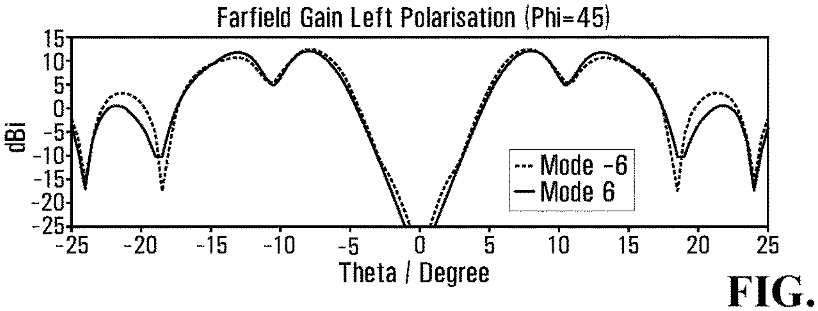
Figure 9H:
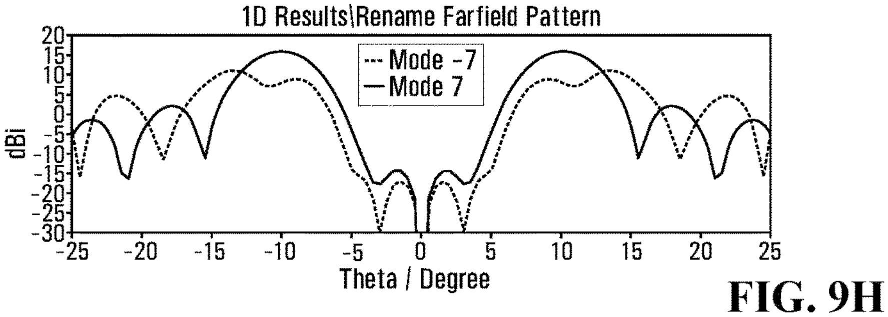

Each waveguide sector 65 includes slot line antennas 66 for radiating circularly polarized EM OAM waves, which are fed into the waveguide sector 65 via a respective coaxial probe 67. According to other embodiments, slot line antennas 66 may instead be configured to transmit linearly polarized EM OAM waves. Each waveguide sector 65 may comprise any suitable number of slot line antennas 66. Each coaxial probe 67 is connected to one of phase shifters 40. According to this embodiment, second radial waveguide portion 64 includes N waveguide sectors 65, and first radial waveguide portion 62 includes 2N waveguide sectors 65. Therefore, radial waveguide 60 includes a total of 3N coaxial probes 67, each coaxial probe 67 configured to feed its corresponding waveguide sector 65 with EM OAM waves transmitted along the coaxial probe 67. Each radial waveguide portion 62, 64 further includes an absorber 68 circumscribing a periphery of the radial waveguide portion 62, 64, for preventing possible leakages of the EM OAM beam transmitted by radial waveguide 60. As can be seen in FIGS. 8C and 8D, the spacing between edges of each waveguide sector 65 and the nearest slot line antennas 66 may be about λ/4, to prevent EM wave reflection. Furthermore, the spacing between edges of each waveguide sector 65 and coaxial probes 67 may be about λ/4, to also prevent EM wave reflection.

A multi-level radial waveguide may be able to transmit or receive EM OAM waves simultaneously, which may result in increased communication bandwidth. For example, compared to radial waveguide 50, radial waveguide 60 includes more waveguide sectors 65, and therefore may benefit from increased transmission/reception bandwidth.

FIGS. 9A-9H show left-hand circular polarized gain radiation patterns under different OAM modes for a radial waveguide with sixteen waveguide sectors.

Figure 10A:
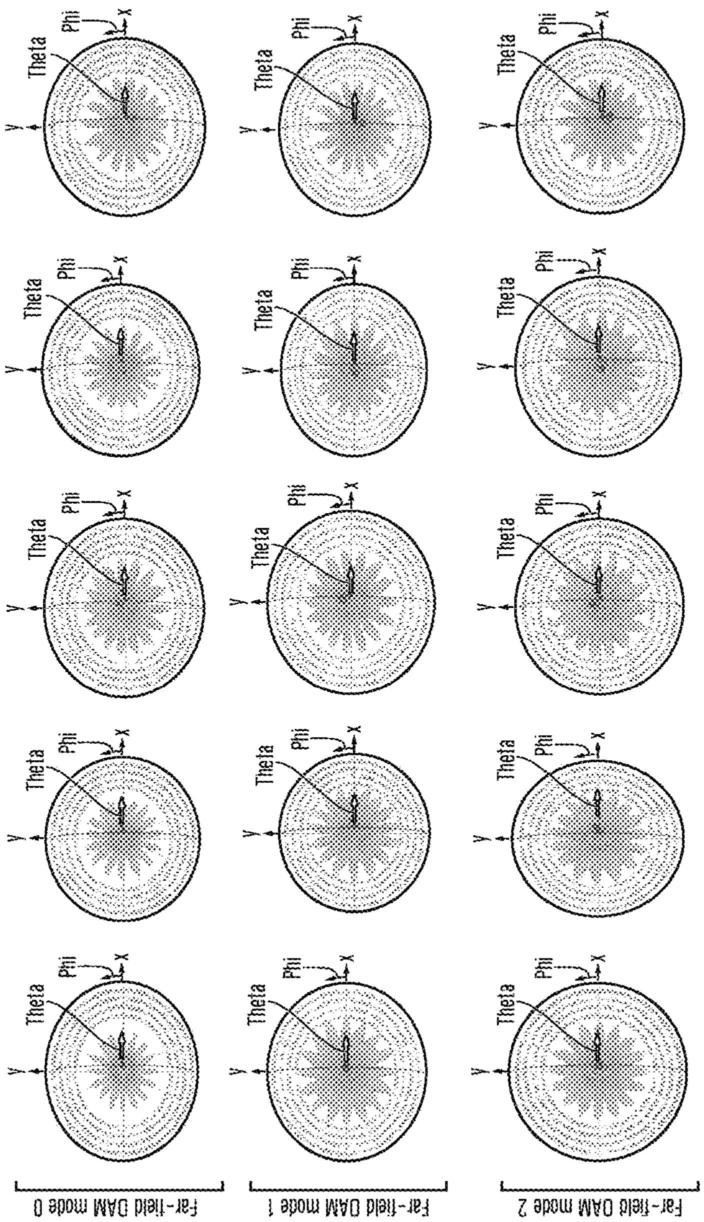
FIGS. 10A and 10B show 360-degree continuous azimuth beam steering of radiation patterns for different OAM modes generated using a beam steering device according to an embodiment of the disclosure.
Figure 10B:
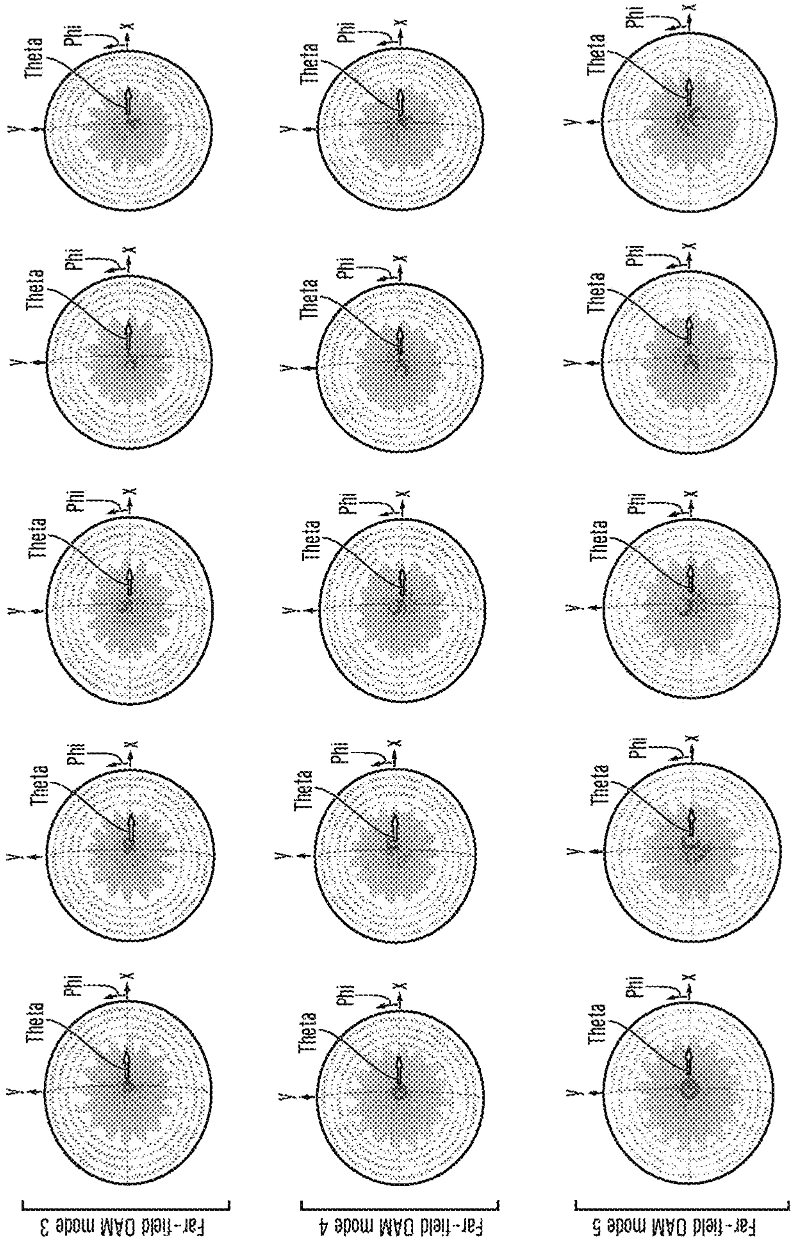
Figure 11A:
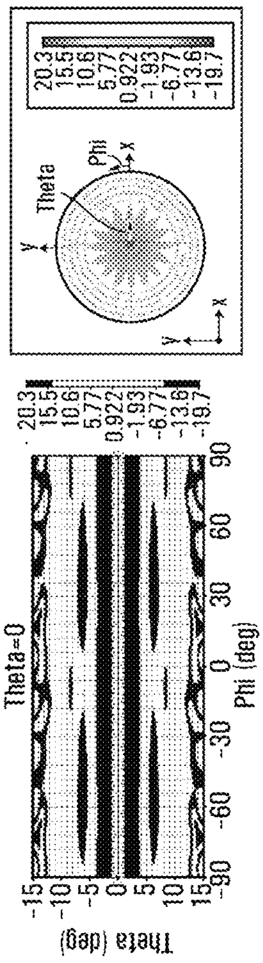
FIGS. 11A-11F show elevation beam steering of OAM radiation patterns generated using a beam steering device according to an embodiment of the disclosure.
Figure 11B:
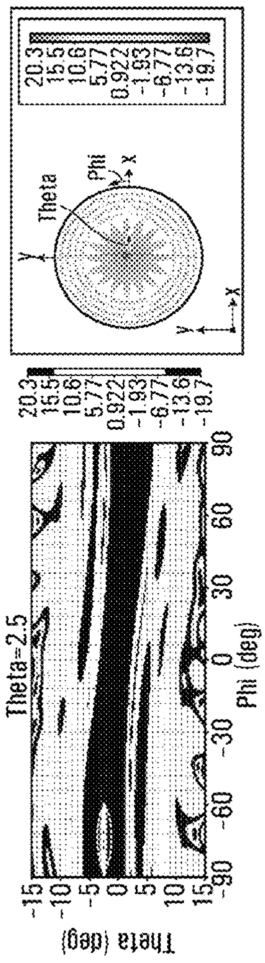
Figure 11C:
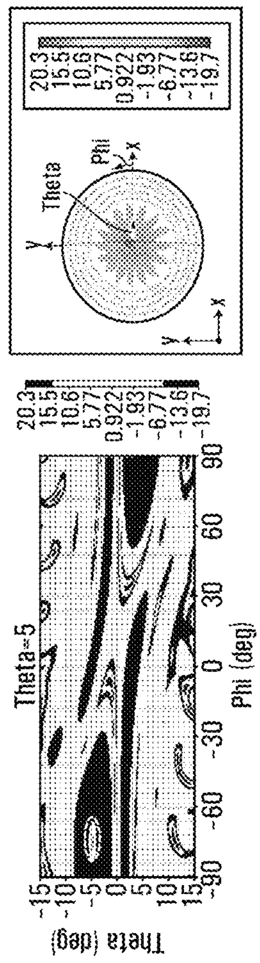
Figure 11D:
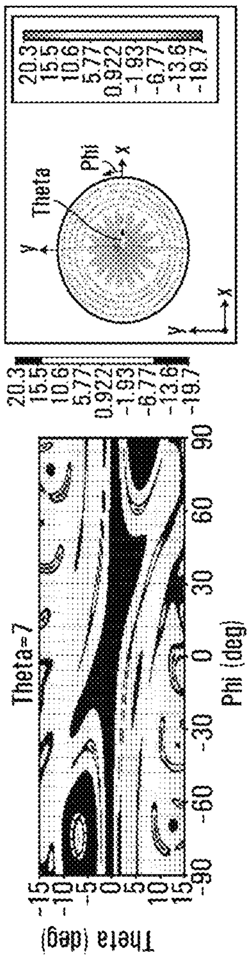
Figure 11E:
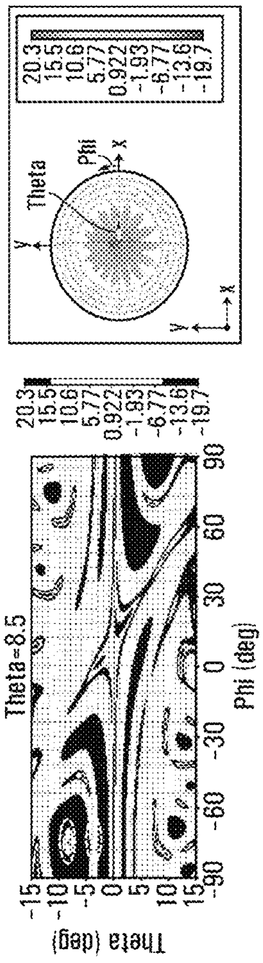
Figure 11F:
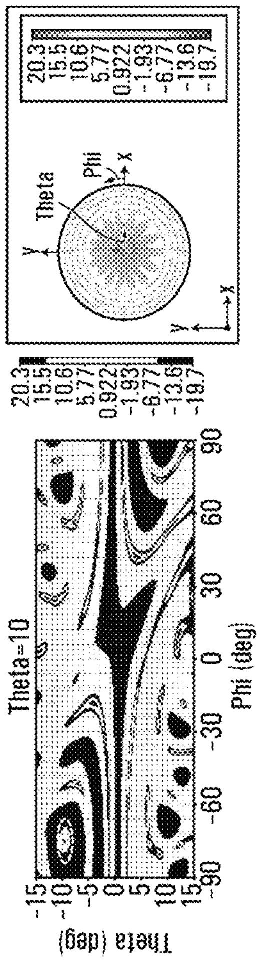

FIGS. 10A and 10B show 360-degree continuous azimuth beam steering of radiation patterns for different OAM modes generated using a beam steering device.

FIGS. 11A-11F show elevation beam steering of OAM radiation patterns generated using a beam steering device.

Does not matter, for multi-level radial waveguide in second embodiment, we employ the same sections 65.

Embodiments of the beam steering devices described herein may be relatively inexpensive due to the absence of active mm-wave components such as monolithic microwave integrated circuits (MMIC), microelectromechanical systems (MEMS), and pin diodes.

As can be seen from the above, by sectorizing a radial waveguide, and by controlling the phase shifters according to a steering pattern set by the controller, EM OAM waves that are output from the Butler matrix may be steered. In particular, the sectorization of the radial waveguide into multiple differently-oriented waveguide sectors enables different phase-modulated EM OAM waves to be input to each waveguide sector. This may also allow the beam steering device to benefit from less phase ripple for high-order OAM modes.

Embodiments of the disclosure may be used, for example, in fixed backhaul and mobile wireless applications. In particular, the ability to steer an EM beam with multiple simultaneous OAM modes is important for the proper alignment of transmitter-receiver systems in such applications.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, as used herein, the terms coupled, coupling, or connected can indicate that two elements or devices are directly connected to one another or connected to one another through one or more intermediate elements or devices via a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. An apparatus for steering a beam, comprising:
- a beamforming device for receiving electromagnetic (EM) waves and outputting, based on the received EM waves, EM waves having one or more orbital angular momentum (OAM) modes;
- phase shifters for modulating, based on one or more steering patterns, the EM waves outputted by the beamforming device; and
- a radial waveguide divided into multiple waveguide sectors, each waveguide sector comprising:
  - an input connected to one of the phase shifters; and
  - one or more slot line antennas for transmitting the EM waves modulated by the phase shifter connected to the input, wherein the one or more slot line antennas are oriented differently to the one or more slot line antennas of each other waveguide sector.

2. The apparatus of claim 1, wherein the beamforming device comprises a Butler matrix.

3. The apparatus of claim 1, further comprising a controller operable to:
- set the one or more steering patterns; and
- control the phase shifters to modulate, based on the one or more steering patterns, the EM waves outputted by the beamforming device.

4. The apparatus of claim 3, wherein the controller is further operable to:
- adjust the one or more steering patterns; and
- steer, based on the adjusted one or more steering patterns, a beam formed by the transmission of the EM waves by the one or more slot line antennas of each waveguide sector.

5. The apparatus of claim 3, wherein the controller is further operable to control the beamforming device so as to adjust the one or more OAM modes of the EM waves output by the beamforming device.

6. The apparatus of claim 1, wherein the radial waveguide further comprises one or more absorbers separating each waveguide sector from each adjacent waveguide sector and configured to absorb EM waves incident on the one or more absorbers.

7. The apparatus of claim 1, wherein the slot line antennas of the radial waveguide are configured to circularly polarize the EM waves modulated by the phase shifters.

8. The apparatus of claim 1, wherein the slot line antennas of the radial waveguide are configured to linearly polarize the EM waves modulated by the phase shifters.

9. The apparatus of claim 1, wherein each waveguide sector comprises a cavity filled with air.

10. The apparatus of claim 1, wherein the slot line antennas of the radial waveguide are positioned so as to define a number of concentric circles.

11. The apparatus of claim 1, wherein the radial waveguide is a first radial waveguide, and wherein the apparatus further comprises:

a second radial waveguide concentric with the first radial waveguide and divided into multiple waveguide sectors, each waveguide sector of the second radial waveguide comprising:
an input connected to one of the phase shifters; and
one or more slot line antennas for transmitting the EM waves modulated by the phase shifter connected to the input, wherein the one or more slot line antennas are oriented differently to the one or more slot line antennas of each other waveguide sector of the second radial waveguide, and wherein a radius of the second radial waveguide is less than a radius of the first radial waveguide.

12. A method of transmitting a beam, comprising:
generating electromagnetic (EM) waves having one or more orbital angular momentum (OAM) modes;
modulating, using phase shifters, and based on one or more steering patterns, the EM waves; and
transmitting the modulated EM waves using a radial waveguide divided into multiple waveguide sectors, each waveguide sector comprising one or more slot line antennas oriented differently to the one or more slot line antennas of each other waveguide sector.

13. The method of claim 12, wherein the modulating comprises:
setting the one or more steering patterns; and
controlling the phase shifters to modulate, based on the one or more steering patterns, the EM waves.

14. The method of claim 13, further comprising:
adjusting the one or more steering patterns; and
steering, based on the adjusted one or more steering patterns, a beam formed by the transmission of the EM waves.

15. The method of claim 12, further comprising:
adjusting the one or more OAM modes.

16. The method of claim 12, wherein the radial waveguide further comprises one or more absorbers separating each waveguide sector from each adjacent waveguide sector and configured to absorb EM waves incident on the one or more absorbers.

17. The method of claim 12, wherein each waveguide sector comprises a cavity filled with air.

18. The method of claim 12, wherein the slot line antennas of the radial waveguide are positioned so as to define a number of concentric circles.

19. The method of claim 12, wherein the radial waveguide is a first radial waveguide, and wherein transmitting the modulated EM waves further comprises transmitting the modulated EM waves using:
a second radial waveguide concentric with the first radial waveguide and divided into multiple waveguide sectors, each waveguide sector of the second radial waveguide comprising one or more slot line antennas oriented differently to the one or more slot line antennas of each other waveguide sector of the second radial waveguide.

* * * * *